United States Patent [19]
Watanabe et al.

[11] Patent Number: 5,285,358
[45] Date of Patent: Feb. 8, 1994

[54] VEHICULAR HEADLAMP

[75] Inventors: Saburo Watanabe; Hidehiko Nagasawa, both of Shizuoka, Japan

[73] Assignee: Koito Manufacturing Co., Ltd., Tokyo, Japan

[21] Appl. No.: 979,815

[22] Filed: Nov. 20, 1992

[30] Foreign Application Priority Data

Jan. 27, 1992 [JP] Japan .................................. 4-12015

[51] Int. Cl.⁵ .............................................. B60Q 1/14
[52] U.S. Cl. ..................................... 362/61; 362/335; 362/351
[58] Field of Search .................. 362/61, 310, 328, 329, 362/335, 351, 308

[56] References Cited

U.S. PATENT DOCUMENTS

| | | | |
|---|---|---|---|
| 1,614,027 | 1/1927 | Graf | 362/329 |
| 3,598,989 | 8/1971 | Biggs | 362/329 |
| 4,985,816 | 1/1991 | Seko et al. | 362/61 |

FOREIGN PATENT DOCUMENTS 0005080 10/1979 European Pat. Off. .
2149077 6/1985 European Pat. Off. .

*Primary Examiner*—Ira S. Lazarus
*Assistant Examiner*—L. Heyman
*Attorney, Agent, or Firm*—Sughrue, Mion, Zinn, Macpeak & Seas

[57] ABSTRACT

A vehicular headlamp which provides a high beam of good visibility. The inventive vehicular headlamp includes first and second headlamp main bodies, and at least a light source and a reflector for reflecting the light of the light source forwardly. The second headlamp main body includes an integrated light projection unit which is composed of a reflector formed in a substantially ellipsoidal shape, a light source disposed at a first focal point of the reflector, a projection lens disposed in front of the light source for projecting and distributing forwardly light reflected from the reflector, and a shade disposed at the focal point of the projection lens for forming the low beam. The second headlamp main body forms the low beam and cooperates with the first headlamp main body in forming the high beam. The headlamp is characterized in that a shade for reducing the amount of light emitted is disposed at a position offset rearward and forward from the focal position of the projection lens with respect to the optical axis of the light projection unit and on the opposite side to the low beam forming shade with the optical axis therebetween.

9 Claims, 8 Drawing Sheets

VEHICULAR HEADLAMP

BACKGROUND OF THE INVENTION

The present invention relates to a vehicular headlamp including a light projection unit which employs a projection lens to project and direct light produced by a light source and reflected by a substantially ellipsoidal reflector to thereby form a low beam. More particularly, the invention relates to a vehicular headlamp in which a second headlamp main body consisting of the light projection unit forms a low beam from a single beam of the light projection unit and the beam of the first headlamp main body is combined with the beam of the second headlamp main body to thereby form a high beam.

In FIG. 15 there is shown a conventional headlamp of the above-mentioned type in which a parabolic reflector unit a forming a first headlamp main body, a light projection unit b forming a second headlamp, and a side lamp unit c are mounted together between a lamp body 1 and a front lens 2. According to this structure, a low beam (indicated by P1 in FIG. 16) is formed by only the light projection unit b, while a high beam (which includes the areas of $P_1$ and $P_2$ in FIG. 16) is formed by light reflected from the parabolic reflector unit a and the light projection unit b.

The light projection unit b is of an integral structure in which a light source 4 is disposed at a first focal point of a substantially ellipsoidal reflector 3, a projection lens 6 is disposed in front of the reflector 3, and a shade 5 is disposed at a focal point of the projection lens 3 for intercepting a part of the light produced by the source 4 to thereby form a low beam. These components are integrated into one unit.

The light projection unit b is able to provide a larger quantity of light and is more compact in size than the headlamp main body a of a parabolic reflector unit type which reflects the light of a light source 7 with a parabolic reflector 8 and distributes and controls the light using light distribution and control steps 2a formed on the front lens 2. For this reason, light projection units have been recently used more frequently.

In FIG. 16, reference numeral 9 designates an extension reflector which intercepts light to thereby prevent the light from leaking from respective areas, that is, a headlamp area and a side lamp area, and covers gaps in the periphery of the first and second headlamp main bodies a and b to thereby make the whole interior of the lap body have a mirrored appearance when viewed from the outside to thus make it look more attractive.

However, in the conventional headlamp, the near portion (the area close to the vehicle) of the high beam, which is produced by combining together the beams of the parabolic reflector unit a and light projection unit b, generally receives a disproportionately great share of the total light output so that distant areas (areas shown by oblique lines in FIG. 16) of the high beam are relatively darker, thereby impairing the illuminating pattern of the headlamp.

SUMMARY OF THE INVENTION

The present applicants have investigated the above problem and confirmed that the problem arises from the fact that the amount of light contributed by the light projection unit b is too great.

The present invention is directed at eliminating the drawbacks found in the above-mentioned headlamps.

Accordingly, it is an object of the invention to provide a vehicular headlamp which can provide a high beam of an improved visibility.

In order to achieve the above and other objects, according to the invention, there is provided a vehicular headlamp which includes first and second headlamp main bodies each having at least a light source and a reflector for reflecting forwardly light produced by the light source. The second headlamp main body includes a light projection unit integrally composed of a reflector formed in a substantially ellipsoidal shape, a light source disposed at a first focal position of the reflector, a projection lens disposed in front of the light source for projecting and distributing forwardly light reflected from the reflector, and a shade disposed at the focal position of the projection lens for forming a low beam. The second headlamp main body is thus adapted to form a low beam and to cooperate with the first headlamp main body in forming a high beam. The vehicular headlamp of the invention is further characterized in that a shade for reducing an amount of light emitted is disposed at a position offset from the focal position of the projection lens in the direction of the optical axis of the light projection unit and on the opposite side to the high beam forming shade with the optical axis therebetween.

The shade for forming the low beam may be disposed below the optical axis of the light projection unit, and the shade for reducing the amount of light emitted is disposed above the optical axis and forward of the focal point of the projection lens (that is, on the projection side). The shades may be formed integrally on a lens holder.

In the second headlamp main body (light projection unit), the light is intercepted in part by the light amount reducing shade so that the intensity of the beam (a second beam) is decreased. The second beam is combined with the beam (a first beam) of the first headlamp main body to thereby form a high beam. With this arrangement, the difference between the amount of light in the overlapping illumination area (the side area) of the first and second beams and the amount of light in the independent illumination area (distant area) of the first beam is reduced. Also, because the light amount reducing shade is located at a position offset rearward and forward from the focal position of the projection lens in the optical axis direction, there is eliminated the possibility of a shadow of the shade appearing in the light distribution pattern of the second beam. Further, due to the fact that the intensity of the beam (second beam) formed by the light projection unit is larger than the intensity of the beam formed by the parabolic reflector unit, even if the intensity of the second beam is reduced slightly, the second beam can still function as the high beam sufficiently.

Moreover, by integrally forming the shade for forming the low beam and the shade for reducing the amount of light emitted with a lens holder, the total number of parts is reduced.

DESCRIPTION OF THE PREFERRED EMBODIMENTS

A detailed description is provided hereinbelow of preferred embodiments of a vehicular headlamp constructed according to the invention.

Figure 1:
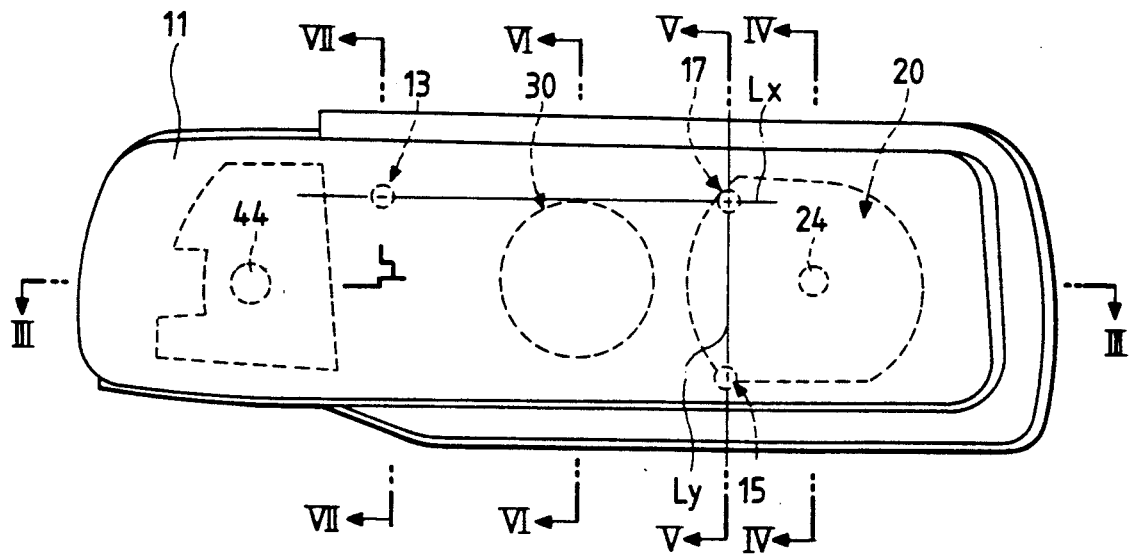
FIG. 1 is a front view of a first embodiment of a vehicular headlamp according to the invention.
Figure 2:
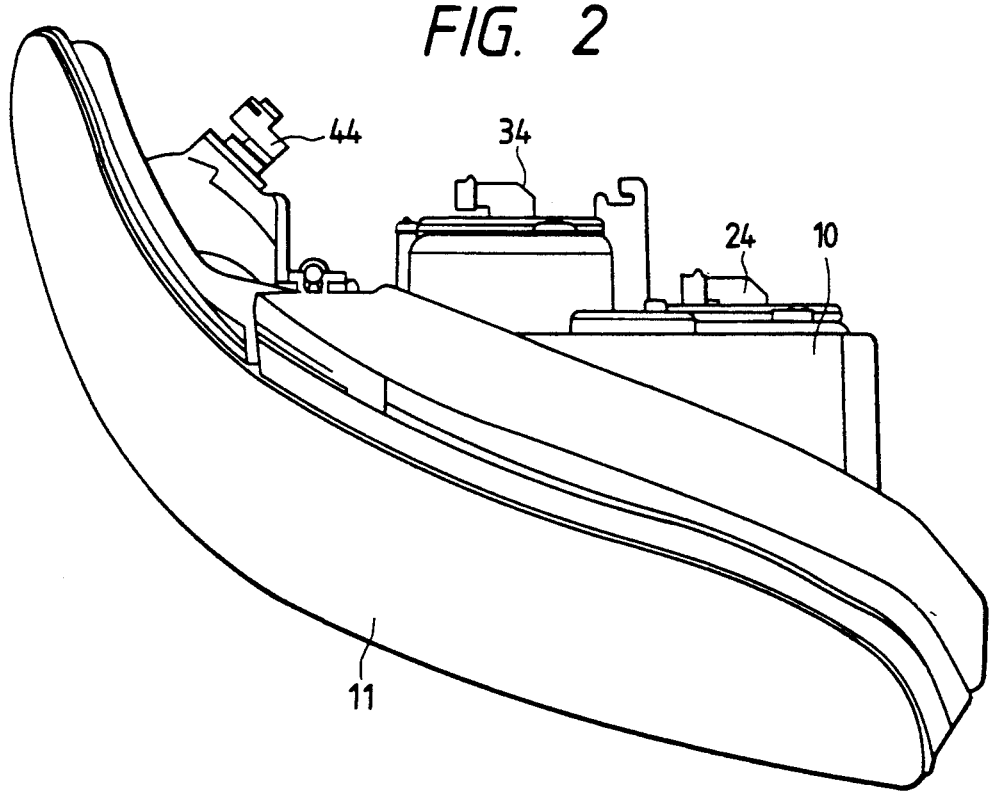
FIG. 2 is a plan view of the headlamp of the first embodiment.
Figure 3:
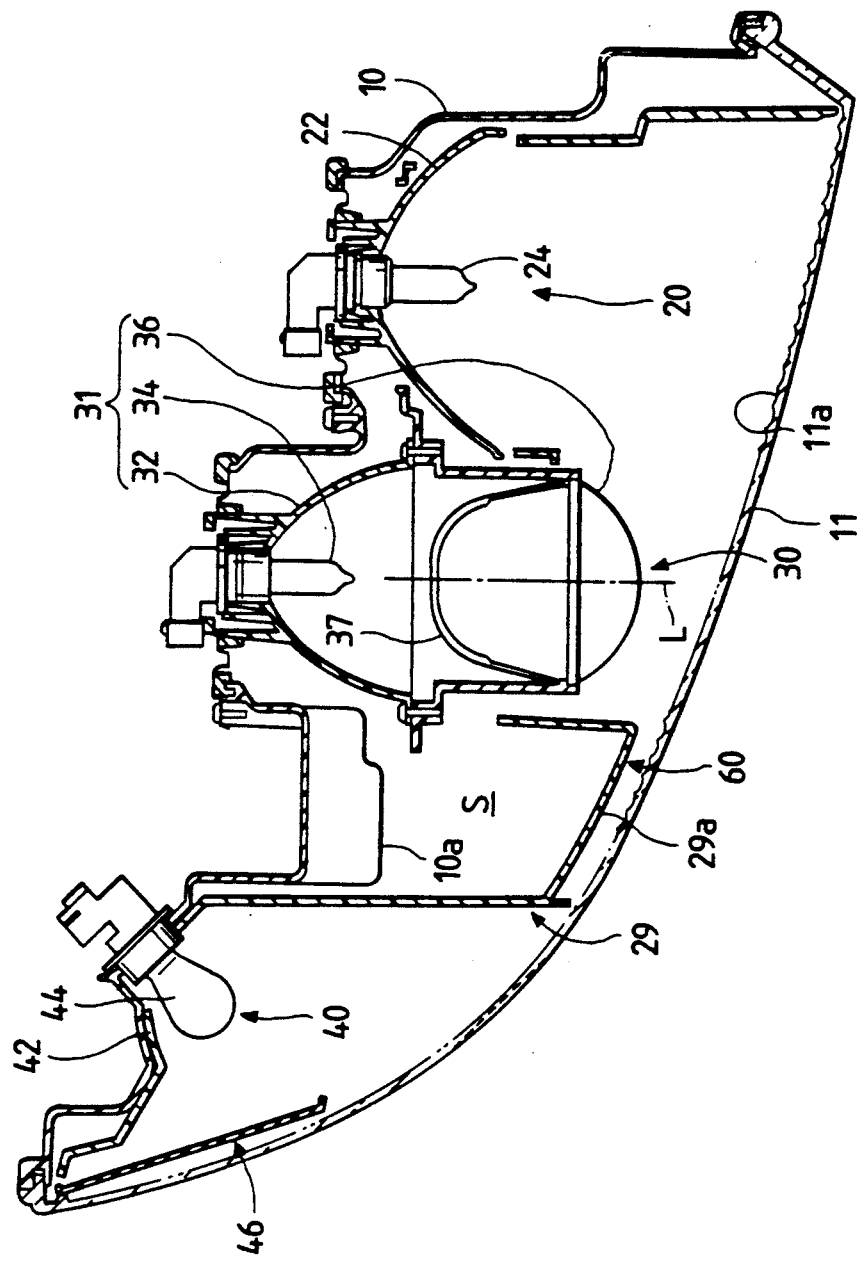
FIG. 3 is a horizontal section view of the first embodiment (a sectional view taken along the line III—III shown in FIG. 1)
Figure 6:
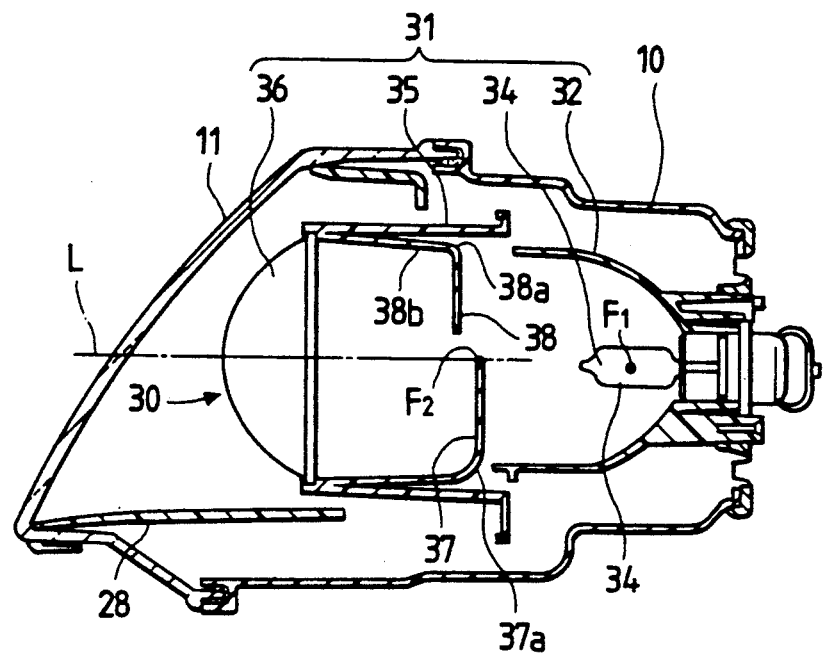
FIG. 6 is a longitudinal section view of the first embodiment (a sectional view taken along the line VI—VI shown in FIG. 1)
Figure 7:
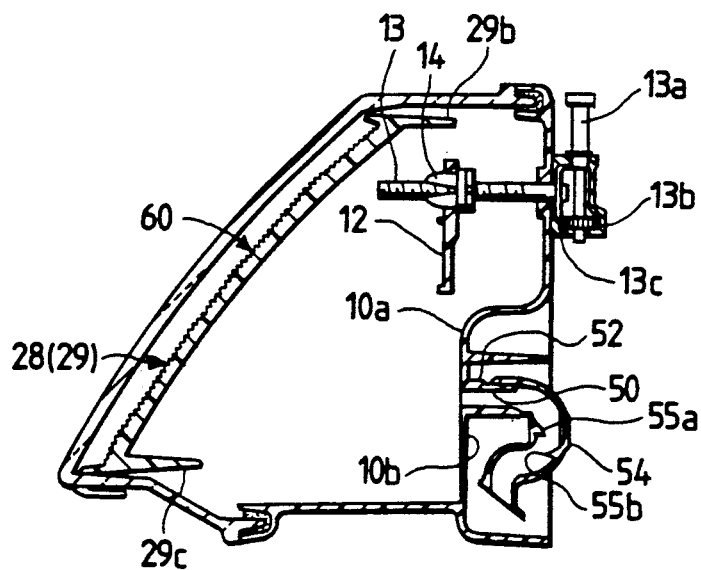
FIG. 7 is a longitudinal section view of the first embodiment (a sectional view taken along the line VII—VII shown in FIG. 1)
Figure 8:
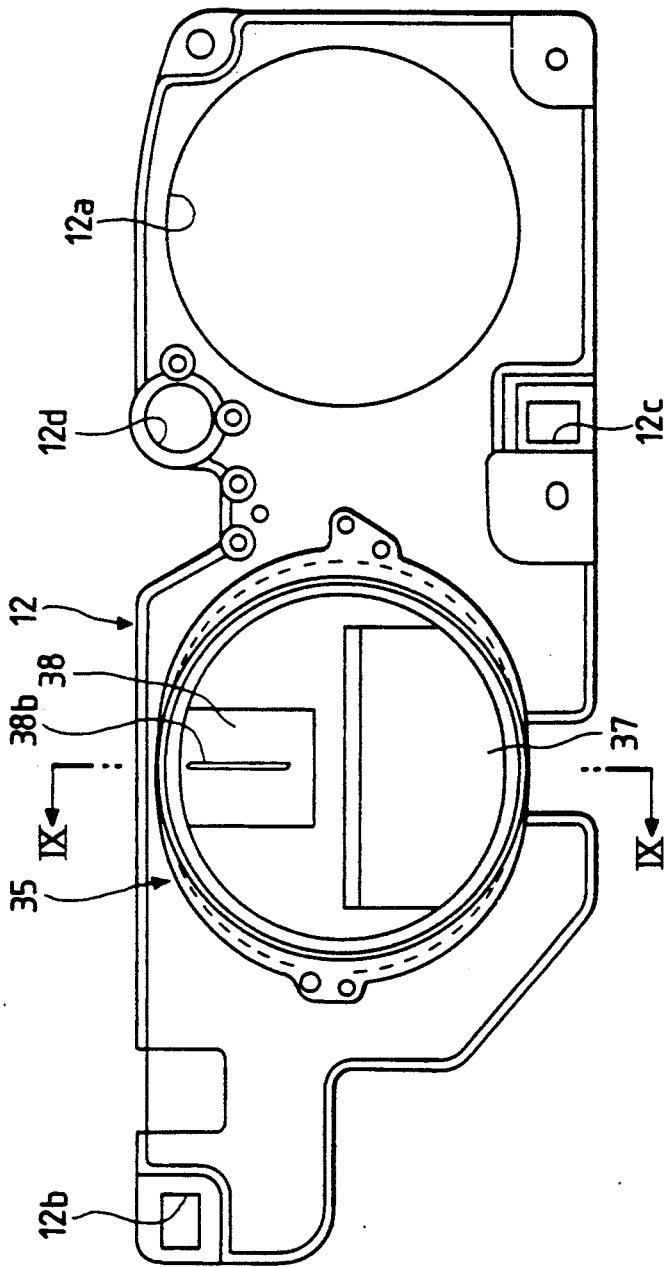
FIG. 8 is a front view of a lens holder employed in the first embodiment.
Figure 9:
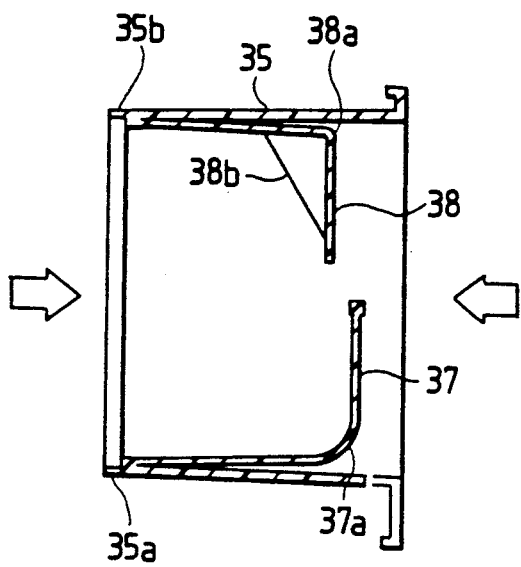
FIG. 9 is a longitudinal sectional view of the lens holder (a sectional view taken along the line IX—IX shown in FIG. 8)

FIGS. 1 to 9 show a first preferred embodiment of a vehicular headlamp according to the invention. In particular, FIG. 1 is a front view of a vehicular headlamp according to the invention, FIG. 2 is a plan view of the same headlamp, FIG. 3 is a horizontal section view of the same headlamp taken along the line III—III shown in FIG. 1, FIGS. 4 to 7 are longitudinal sectional views of the same headlamp respectively taken along the lines IV—IV, V—V, VI—VI and VII—VII shown in FIG. 1, FIG. 8 is a front view of a lens holder, and FIG. 9 is a sectional view taken along the line IX—IX shown in FIG. 8.

In these figures, reference numeral 10 designates a vessel-like lamp body which is opened forwardly. The lamp body 10 includes a front surface opening to which a front lens 11 is attached, and a lamp chamber space which extends curvedly from the front surface toward the lateral side thereof. In the lamp body 10, there are provided in a side-by-side arrangement a first headlamp main body 20, which is a parabolic reflector unit, for forming a high beam, a second headlamp main body 30, which is a light projection unit for forming a low beam, and a side lamp main body 40.

The first headlamp main body 20 includes a parabolic reflector 22 and a bulb 24 inserted into the reflector 22 and serving as a light source. Light emitted from the filament of the bulb 24, which is disposed substantially at the focal position of the reflector 22, is reflected by the reflector 11 to thereby provide a substantially parallel light beam, which is then guided forwardly and distributed by diffusion steps 11a formed on the rear side of the front lens 11 to thereby control the light distribution pattern.

The second headlamp main body 30 is composed mainly of a light projection unit 31 which includes a reflector 32 of a substantially ellipsoidal shape, a bulb 34 inserted into the reflector 32 and serving as a light source, and a projection lens 36 having a front surface of a substantially circular shape mounted in the front surface opening of the reflector 32 by means of a lens holder 35 of a substantially cylindrical shape.

The bulb 34 has a filament which is positioned at a first focal point $F_1$ of the substantially ellipsoidal reflector 32. Light emitted from the filament is reflected by the reflector 32 and is directed forwardly, and is then projected and distributed forwardly by the projection lens 36.

Reference numeral 37 designates a shade for forming a low beam. The shade 37 is mounted within the lens holder 35 and is disposed at a focal point $F_2$ of the projection lens 36. A part of the light reflected toward the projection lens by the reflector 32 is intercepted by the low beam forming shade 37 to thereby provide a low beam. The shade 37 includes an upper edge portion which is used to form a clear-cut line of the low beam. That is, the beam of the first headlamp main body 20 and the beam of the second headlamp main body 30 are combined with each other to thereby form a high beam, while the low beam is formed solely by the beam of the second headlamp main body 30.

Reference numeral 38 indicates another shade which is located within the lens holder 35 on the opposite side of the low beam forming shade 37 with the optical axis L of the second headlamp main body 30 (light projection unit 31) between the two shades. The shade 38 is disposed in front of the shade 37 and down toward the projection lens from the focal point $F_2$ position. The shade 38 decreases the luminous intensity in a predetermined region of the light distribution pattern formed by the beam of the second headlamp main body 30 (that is, the light projection unit 31), for example, the luminous intensity at a position 4° below the horizontal center line of the headlamp. Also, due to the fact that the shade 38 is disposed at a position offset greatly toward the projection lens side from the focal point $F_2$ of the projection lens 36, the shade 38 will not create a shadow in the light distribution pattern. This decreases the difference between the amount of light in the side area of the illumination area of the high beam (that is, the overlapping illumination area of the beams of the first and second headlamp bodies 20 and 30) and the amount of light in a distant area of the high beam (that is, the independent illumination area of the beam of the firs headlamp main body 20). As a result, the distant area of the high beam is made easy to see, that is, the visibility in the distant area is improved. Also, the second headlamp main body 30 (light projection unit 31) provides a larger amount of light than the parabolic reflector unit and, for this reason, even if the amount of light thereof is slightly reduced by the shade 38, the second headlamp main body 30 can provide a sufficient amount of light for the low beam.

The two shades 37 and 38, as shown in FIGS. 6, 8 and 9, are formed integrally with the lens holder 35. Specifically, the lens holder 35 is formed of aluminum by die casting, that is, the lens holder 35 is formed by applying pressure to aluminum in the axial direction (in the direction of an arrow shown in FIG. 9). The shades 37 and 38 extend rearwardly and obliquely from the front end portions 35a and 35b of the lens holder 35. In particular, the shade 37 is shaped in such a manner that the rear end position of the rearwardly/obliquely extending portion is curved substantially at right angles and extends downwardly. The curved portion 37a of the shade 37 enables the material of the shade 37 to flow smoothly to the leading end side of the shade 37 when the shade 37 is formed.

In the vertically curved portion 38a of the shade 38, there is provided a connecting portion 38b which connects the inside of the curved portion 38a obliquely. The connecting portion 38b, similarly to the curved portion 37a of the shade 37, also enables the material of the shade 38 to flow smoothly to the leading end side of the shade 38 when the shade is formed. Also, the connecting portion 38b acts as the reinforcing portion of the shade 38.

The two headlamp main bodies 20 and 30 are integrally connected by a plate-shaped bracket 12 (see FIG. 8) which is formed integrally with the lens holder 35, and they are supported in a manner so as to be inclinable with respect to the lamp body 10 by two aiming screws 13 and 15 and a ball joint 17. Reference numerals 14 and 16 indicate nuts with which the aiming screws 13 and 15 are threadedly engaged, and reference numeral 18 designates a bearing part for the ball joint 17. The screws and bearing part are inserted into the bracket 12. Reference numeral 12a in FIG. 8 denotes an opening for engagement formed in the reflector 22 of the first headlamp main body 20, reference numerals 12b and 12c designate insertion holes into which the nuts 14 and 16 are to be inserted, and reference numeral 12d indicates an insertion hole into which the bearing part 18 of the ball joint is inserted. That is, the first and second headlamp main bodies 20 and 30 integrally connected by the plate-shaped bracket 12 are supported inclinably with respect to the horizontal axis Lx and the vertical axis Ly (see FIG. 1), and the illuminating directions of the headlamp main bodies 20 an 30 can be adjusted by rotating the aiming screws 13 and 15. Reference numerals 13a and 15a respectively denote operational shafts, the rotational forces of which are transmitted through gears 13b, 13c and 15b, 15c to the screws 13 and 15, respectively.

Reference numeral 28 designates an extension reflector of a rectangular frame shape which extends forwardly along the side wall of the lamp body from a position adjacent to the opening edge portion of the reflector 22 of the first headlamp main body 20 and the lens holder 35 of the second head lamp main body 30. The surface of the extension reflector 28 is treated by aluminum evaporation similarly as in the case of the reflector 22. The aluminum evaporation treated surface of the extension reflector 28 covers the peripheral areas of the first and second headlamp main bodies 20 and 30, and makes the entire interior of the lamp chamber have a mirrored appearance when viewed from the outside, thereby improving the external appearance of the headlamp.

Figure 4:
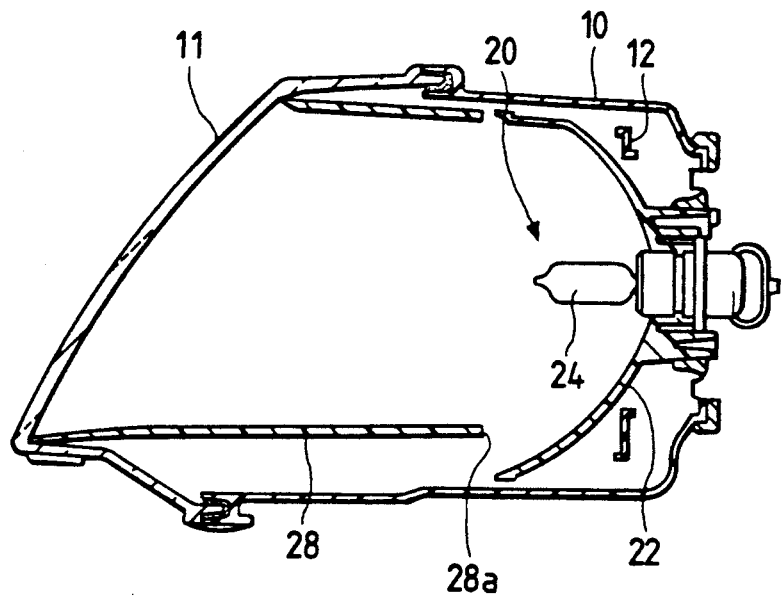
FIG. 4 is a longitudinal section view of the first embodiment (a sectional view taken along the line IV—IV shown in FIG. 1)
Figure 5:
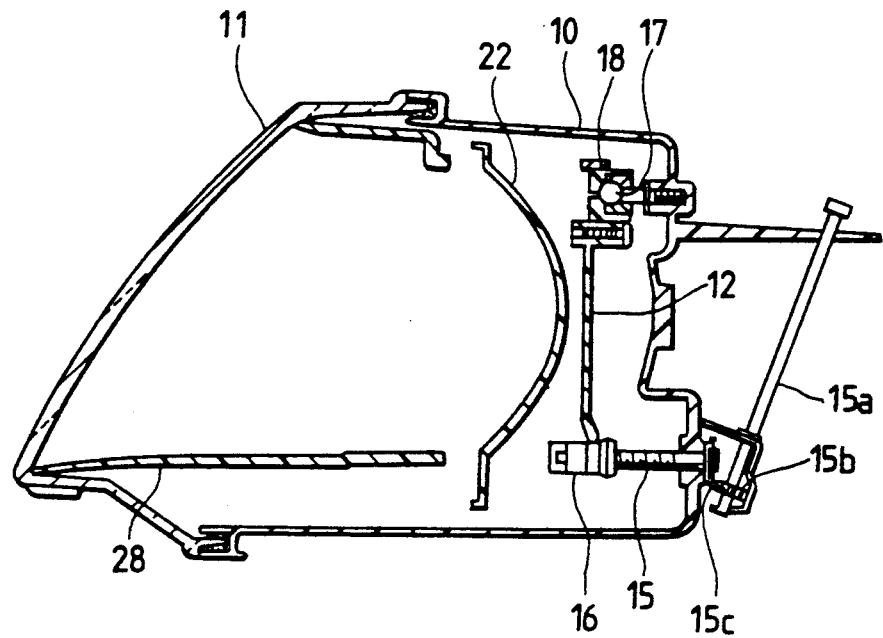
FIG. 5 is a longitudinal sectional view of the first embodiment (a sectional view taken along the line V—V shown in FIG. 1)

The side lamp main body 40 includes a reflector 42 of a parabolic shape which is mounted in the lamp body 10, and a bulb 44 which is inserted into the reflector 42. Reference numeral 46 designates a reflex reflector which is disposed in the side edge portion of the front surface lens 11. The reflector 42 is integrally connected with the extension reflector 28 disposed on the headlamp main body side by means of a frame-like portion 29 (see FIG. 3) of a U-shaped horizontal section which includes a U-shaped vertical rod-like portion 29a disposed on the front surface side. In other words, between the extension reflector 28 and reflector 42, there is formed a U-shaped frame-like portion 29 which projects out forwardly to serve as a light shielding wall for preventing light from the side lamp and headlamp from leaking into other lamp areas. For this purpose, there is formed a large heat radiation space S between the second headlamp main body 30 and the side lamp main body 40. The extension reflector 28 is disposed adjacent the headlamp main bodies 20 and 30, but within a range so as not to interfere with the inclining movements of the headlamp main bodies 20 and 30. However, the side edge end 28a of the lower side wall of the extension reflector 28 facing the reflector 22 is spaced a distance from the reflector 22, as shown in FIG. 4, so as to be able to improve the ventilation in the front and rear areas of the extension reflector 28 within the lamp chamber space.

Also, in the upper and lower side edge portions of the U-shaped frame-like portion 29 there are formed flange portions 29b and 29c which extend in a forward-and-rearward direction (horizontal direction) in order to improve the strength of the U-shaped frame-like portion 29, which is a connecting portion for connecting the reflector 42 with the extension reflector 28. The integrated unit composed of the reflector 42 and the extension reflector 28, as shown in FIG. 3, is in contact at the front edge portions of the right and left side walls thereof with the lamp body 10 and the rear side of the front surface lens 11 and, as shown in FIGS. 4 to 7, is in contact at the front edge portions of the upper and lower side walls thereof with the rear side of the front surface lens 11, so that the integrated unit can be positioned in the above-mentioned manner.

Also, an area 10a in the rear surface wall of the lamp body 10 corresponding to the frame-like portion 29, as shown in FIGS. 3 and 7, is pushed out forwardly; that is, on the rear surface side of the lamp body 10, there is formed a recessed portion 10b which corresponds to the U-shaped frame-like portion 29 provided in the extension reflector 28. In the recessed portion 10b, there is formed a ventilation hole 50 which connects the lamp chamber space with the outside. The ventilation hole 50 is defined by a hole formed in a boss 52 extending horizontally and rearwardly from the wall forming the recessed portion 10b and a flexible tube 54 which is externally fitted with and inserted into the projecting tip end portion of the boss 52. The flexible tube 54 is curved 180° in a hairpin shape, and is further curved vertically, with the opening end portion thereof facing downwardly. The vertical pipe portion of the flexible tube 54 is formed in a maze shape by mutually opposing tongue pieces 55a and 55b which extend alternately in an oblique and downward direction, thereby to prevent water or dust from entering the lamp chamber space through the ventilation hole 50. Since the boss 52 and flexible tube 54 defining the ventilation hole 50 are disposed within the recessed portion 10b and thus do not project out greatly in the rear of the rear surface of the lamp body 10, they will not interfere with parts provided in the body of an automobile.

Figure 10:
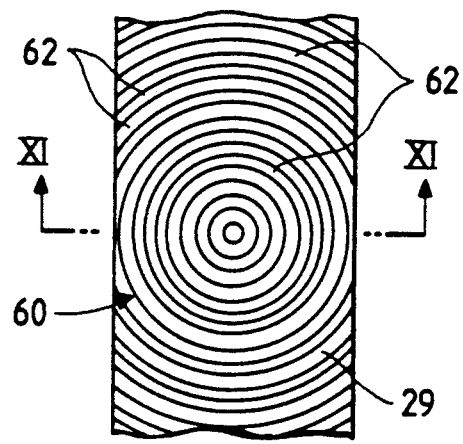
FIG. 10 is a view of a front surface pattern of a frame-like portion having a U-shaped horizontal section provided in an extension reflector employed in the first embodiment.
Figure 11:
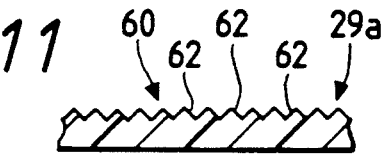
FIG. 11 is a sectional view taken along the line XI—XI shown in FIG. 10.

While the U-shaped frame-like portion 29 of the extension reflector 28 is disposed adjacent the front surface lens 11 so as to act as a light shield wall, on the front surface of the U-shaped frame-like portion 29, as shown in FIGS. 10 and 11, there is formed a pattern 60 composed of a plurality of annularly extending grooves 62 formed concentrically with one another. This pattern 60 enables the light to be scattered on the surfaces of the recessed and raised or uneven grooves and, when viewed from the front through the front surface lens 11, this makes the pattern-forming surface look as if it is a reflector so that the inside of the lamp is made to appear uniform.

Figure 12:
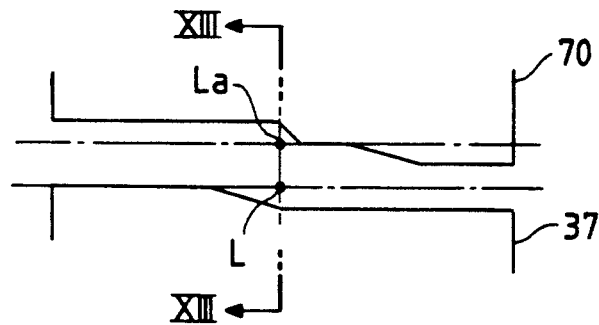
FIG. 12 is a front view of main portions of a second embodiment of a vehicular headlamp according to the invention.
Figure 13:
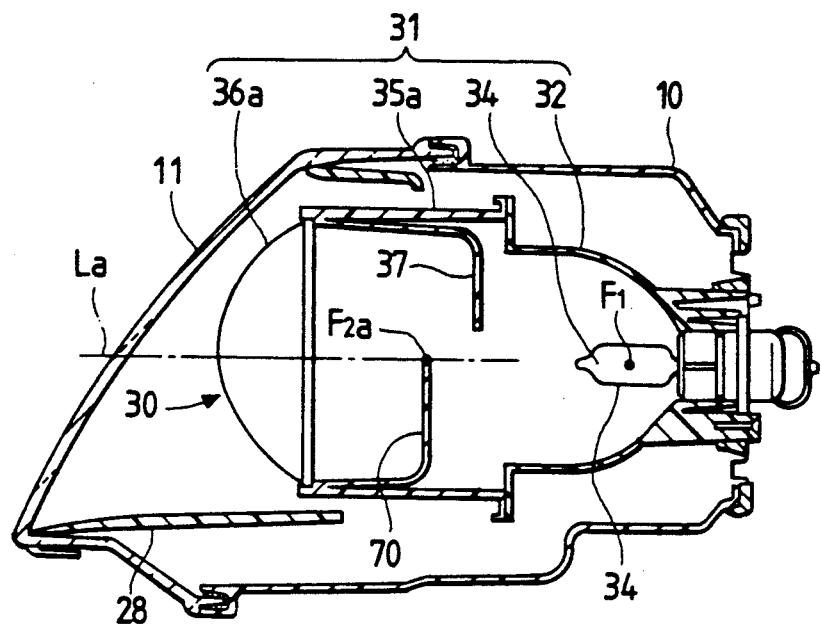
FIG. 13 is a longitudinal sectional view of main portions of the second embodiment (a sectional view taken along the line XIII—XIII shown in FIG. 12)

Referring now to FIGS. 12 and 13, there is shown a second embodiment of a vehicular headlamp according to the invention. In particular, FIG. 12 is a front view of a shade for forming a low beam and a shade for reducing the amount of light emitted disposed within the lens holder of a second headlamp main body (that is, a light projection unit). FIG. 13 is a longitudinal sectional view of the second headlamp main body (light projection unit) with its lens holder assembled upside down (that is, a sectional view of the light projection unit taken along the line XIII—XIII shown in FIG. 12).

The second embodiment employs a lens holder 35a formed in a substantially cylindrical shape. In the lens holder 35a, a shade 70 for reducing the amount of light emitted is mounted on the opposite side of the shade 37 used for forming the low beam, which is disposed below the shade 70, and in front of the focal point of a projection lens 36 which is substantially circular when viewed from the front.

In the second embodiment, when the lens holder 35a is assembled upside down relative to the reflector 32, the shade 70 is able to form a low beam which has a different clear-cut line from the one formed by the shade 37. In other words, according to the second embodiment, the lens holder 35a and reflector 32 can be assembled to each other in a manner different from the arrangement shown in FIG. 12. That is, as shown in FIG. 13, the lens holder 35a can be assembled to the reflector 32 in such a manner that the shade 70 is disposed below the optical axis and the shade 37 is disposed above the optical axis. When the lens holder 35a is assembled upside down in this manner, a position designated by La is the optical axis position of the second headlamp main body 30 (light projection unit 31). Of course, the focal distance of a projection lens 36a employed in the reversely assembled embodiment is shorter than the focal distance of the projection lens employed in the embodiment shown in FIG. 12. That is, by using a projection lens 36a having a focal point $F_2$, namely, a position which is the leading end position of the shade 70, instead of the projection lens employed in FIG. 12, it is possible to form a low beam which has a clear-cut line. In this case, the shade 37 disposed above the optical axis La acts as a light amount reducing shade. Other components used in the second embodiment are the same as those in the first embodiment previously described, and thus they are identified by the same reference numerals and a further description thereof is omitted.

Figure 14:
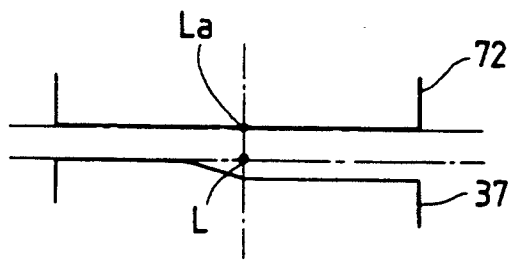
FIG. 14 is a front view of main portions of a third embodiment of a vehicular headlamp according to the invention (a view which corresponds to FIG. 12)
Figure 15:
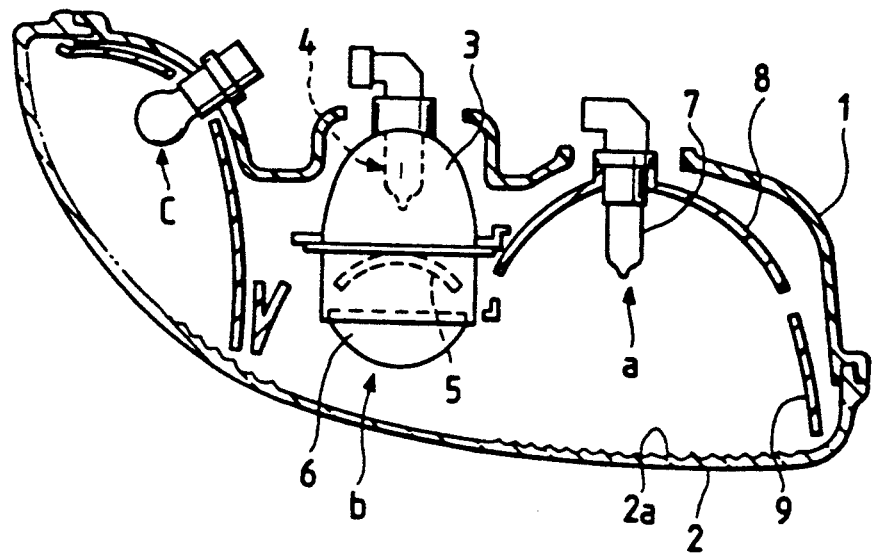
FIG. 15 is a horizontal sectional view of a vehicular headlamp according to the prior art.
Figure 16:
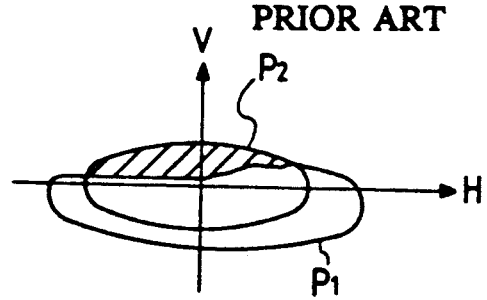
FIG. 16 is a view of a light distribution pattern of a high beam and a low beam of the prior art headlamp.

Referring now to FIG. 14, there are shown main portions of a third embodiment of a vehicular headlamp according to the invention. FIG. 14 is a front view of a shade for forming a low beam and a shade for reducing the amount of light emitted mounted within a lens holder of a second headlamp main body (light projection unit). FIG. 14 corresponds to FIG. 12.

In the third embodiment, only the shape of the leading end portion of the shade 72 for reducing the amount of light emitted is different from that of the shade 70 employed in the second embodiment shown in FIGS. 12 and 13. In other words, the leading end portion of the light amount reducing shade 72 disposed above the optical axis is formed horizontally. When the lens holder is assembled to the reflector in such a manner that the upper and lower shades 72 and 37 are disposed reversely, then the leading end portion of the shade 72 disposed below shade 37 coincides with the optical axis of the light projection unit. The clear-cut line of the low beam formed by the shade 72 is disposed below the horizontal line position and, therefore, the second headlamp main body can be used as a fog lamp.

In the above-mentioned embodiments, the first headlamp main body is of a light projection type and the second headlamp main body is of a light reflection type. However, this is not limitative and both the first and second headlamp main bodies can be implemented with a light projection unit.

As has been described hereinbefore, in a vehicular headlamp according to the invention, since in the second headlamp main body (light projection unit) a part of the light is intercepted by the light-amount reducing shade to thereby reduce the intensity of a beam (a second beam), in the illumination area of the low beam formed by combining the second beam with the beam of the first headlamp main body (a first beam), the difference between the intensity in the overlapping illumination area (side area) of the first and second beams and the intensity in the illumination area (distant area) of only the first beam is reduced, so that the visibility of the distant area is improved.

Also, since the light amount reducing shade is disposed at a position offset rearward or forward in the optical axis direction from the focal position of the projection lens, the shade will not form a shadow in the light distribution pattern of the beam, so that a proper light distribution pattern can be formed. Further, due to the fact that the intensity of the beam formed by the light projection unit is larger than that of the beam formed by the parabolic reflector unit, even if the intensity of the former beam is reduced slightly, the beam can still function as a low beam with no problem.

According to one aspect of the invention, a shade for forming a low beam is formed integrally with a shade for reducing the amount of light, and, therefore, the number of parts required can be reduced. Thus, the light projection unit (the second headlamp main body) can be assembled easily.

What is claimed is:

1. A vehicular headlamp comprising: first and second headlamp main bodies each including at least a light source and a reflector for reflecting light produced by the light source, said second headlamp main body forming a low beam and cooperating with said first headlamp main body in forming a high beam, said second headlamp main body comprising a light projection unit comprising a reflector formed in a substantially ellipsoidal shape having two distinct focal positions, a light source disposed at a first of said two focal positions of said reflector of said second headlamp main body, a projection lens disposed in front of said light source of said second headlamp main body for forwardly projecting and directing light reflected from said reflector of said second headlamp main body, a first shade disposed below said optical axis of said light projection unit at a focal position of said projection lens for forming a low beam, and a second shade disposed above said optical axis at a position offset from said focal position of said projection lens in a direction of an optical axis of said light projection unit and disposed on an opposite side of said optical axis from said first shade.

2. The vehicular headlamp of claim 1, wherein said second shade is disposed in front of said focal position of said projection lens.

3. The vehicular headlamp of claim 2, wherein said second shade is shaped and positioned to reduce a luminous intensity of a light distribution pattern produced by said second headlamp main body in a region approximately 4° below a horizontal center line of said headlamp.

4. The vehicular headlamp of claim 1, further comprising a lens holder for said projection lens, and wherein said two shades are formed integrally with said lens holder.

5. The vehicular headlamp of claim 4, wherein said lens holder and said two shades are formed of die-cast aluminum.

6. The vehicular headlamp of claim 1, wherein said second shade is disposed behind said focal position of said projection lens.

7. A vehicular headlamp comprising: first and second headlamp main bodies each including at least a light source and a reflector for reflecting light produced by the light source, said second headlamp main body forming a low beam and cooperating with said first headlamp main body in forming a high beam, said second headlamp main body comprising a light projection unit comprising a reflector formed in a substantially ellipsoidal shape having two distinct focal positions, a light source disposed at a first focal position of said reflector of said second headlamp main body, a projection lens disposed in front of said light source of said second headlamp main body for forwardly projecting and directing light reflected from said reflector of said second headlamp main body, a first shade disposed above said optical axis of said light projection unit and rearward in a direction of an optical axis of said light projection unit from a focal position of said projection lens, said first shade reducing an amount of light emitted by said second headlamp main body, and a second shade disposed below said optical axis of said light projection unit at a focal position of said projection lens and disposed on an opposite side of said optical axis from said first shade, said second shade forming a low beam of said second headlamp main body.

8. The vehicular headlamp of claim 7, wherein said first shade has a straight horizontally extending edge extending along a line perpendicular to said optical axis and intersecting said focal position of said projection lens.

9. The vehicular headlamp of claim 6, further comprising a lens holder for said projection lens, and wherein said two shades are formed integrally with said lens holder.

* * * * *